United States Patent [19]
Suzuki

[11] Patent Number: 4,735,512
[45] Date of Patent: Apr. 5, 1988

[54] CLINICAL THERMOMETER

[75] Inventor: Takashi Suzuki, Nara, Japan

[73] Assignee: Sharp Kabushiki Kaisha, Osaka, Japan

[21] Appl. No.: 824,872

[22] Filed: Jan. 31, 1986

[30] Foreign Application Priority Data

Feb. 5, 1985 [JP] Japan .................................. 60-21501

[51] Int. Cl.$^4$ .............................................. G01K 7/00
[52] U.S. Cl. ..................................... 374/170; 374/163
[58] Field of Search ............... 374/163, 170, 183, 186; 128/736; 364/557

[56] References Cited

U.S. PATENT DOCUMENTS

| | | | |
|---|---|---|---|
| 3,139,753 | 7/1964 | Brudner | 374/183 |
| 3,776,040 | 12/1973 | Gould III | 374/183 |
| 4,176,556 | 12/1979 | Takenaka | 374/170 |
| 4,377,171 | 3/1983 | Wada | 128/736 |
| 4,447,884 | 5/1984 | Wada | 374/183 |
| 4,488,560 | 12/1984 | Takamura | 128/736 |
| 4,536,851 | 8/1985 | Germanton et al. | 364/557 |

FOREIGN PATENT DOCUMENTS

| | | | |
|---|---|---|---|
| 3318540 | 11/1984 | Fed. Rep. of Germany | 374/170 |
| 113921 | 9/1980 | Japan | 374/170 |
| 86427 | 5/1983 | Japan | 374/170 |
| 85925 | 5/1984 | Japan | 374/163 |
| 128477 | 7/1984 | Japan | 374/163 |
| 2045480 | 10/1980 | United Kingdom | 374/183 |

Primary Examiner—Charles Frankfort
Assistant Examiner—Thomas B. Will
Attorney, Agent, or Firm—Birch, Stewart, Kolasch & Birch

[57] ABSTRACT

An electrical clinical thermometer comprises a thermometer for measuring a temperature value, a storage device for storing the previous temperature value, a detection device for detecting whether the previous temperature value is present, a display responsive to the detection device for displaying the previous temperature value if measured, or otherwise displaying that the previous temperature value was not measured, and a control device responsive to the thermometer for controlling the display to display the current temperature value in place of the previous temperature value in the case where the current temperature value is measured by the thermometer.

8 Claims, 3 Drawing Sheets

CLINICAL THERMOMETER

BACKGROUND OF THE INVENTION

The present invention relates to a clinical thermometer and, more particularly, to an electronic clinical thermometer for storing previous temperature values.

To determine the condition of a human body, it is preferred that the previous temperature value measured by the clinical thermometer be compared with the current value measured by the clinical thermometer. The conventional clinical thermometer, however, indicates the current temperature value only. It is not possible for the current temperature value to be compared with the previous value.

SUMMARY OF THE INVENTION

Accordingly, it is an object of the present invention to provide an improved electronic clinical thermometer for indicating a most recent temperature value, if measured, in addition to a current measured value.

It is another object of the present invention to provide an improved electronic clinical thermometer comprising means for determining whether a previous temperature value was measured or not.

Briefly described, in accordance with the present invention, an electronic clinical thermometer comprises means for measuring a temperature value, means for storing the previous temperature value, if any, measured by the thermometer, detection means for detecting whether the previous temperature value was measured or not, display means responsive to the detection means for displaying the previous temperature value when measured or otherwise indicating that the previous temperature value is not measured, the display means responsive to the current temperature value measured by the means for displaying the current temperature value in place of the previous temperature value, if any.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
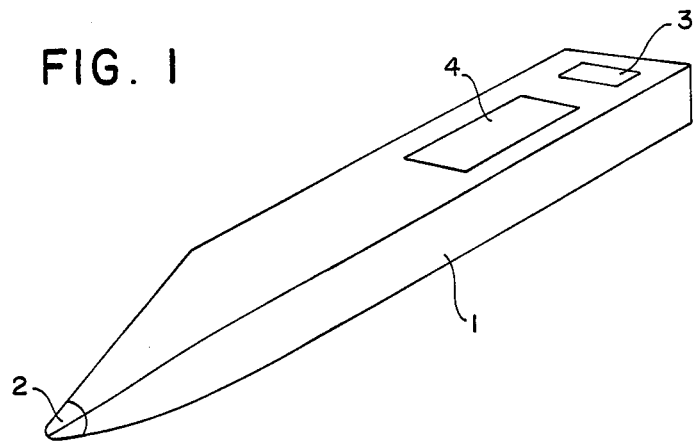
FIG. 1 is a perspective view of an electronic clinical thermometer according to the present invention.

FIG. 1 is a perspective view of an electronic clinical thermometer 1 of the present invention.

Referring to FIG. 1, the body of the thermometer 1 comprises a temperature sensor 2 at its tip. A power switch 3 is provided on the thermometer. When the power switch 3 is ON, the sensor 2 measures a temperature value and the temperature value is displayed in a display 4. After the measurement, the power switch 3 is turned OFF.

Figure 2A:
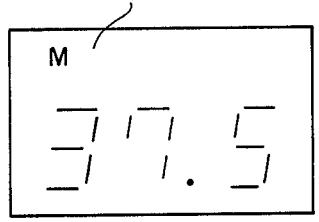
FIGS. 2(a), 2(b), and 2(c) are the display conditions in a display in the thermometer of FIG. 1.
Figure 2B:
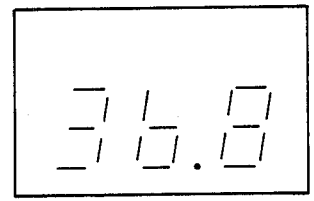
Figure 2C:
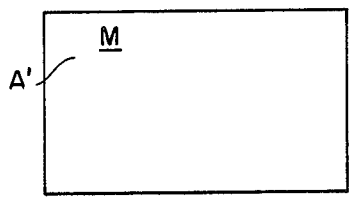

FIGS. 2(a), 2(b), and 2(c) are the display conditions in the display 4. In the ON state of the power switch 3, the most recent temperature value is displayed as viewed in FIG. 2(a). A memory mark A is displayed together with the temperature value to show that the displayed temperature value is a previously measured one. As the current temperature measurement is processed, the memory mark A is erased as shown in FIG. 2(b), so that the current temperature value measured is displayed. FIG. 2(c) shows the condition wherein a previous temperature value has not been measured. A non-memory mark A' is displayed in that case, being different from the memory mark A.

Figure 3:
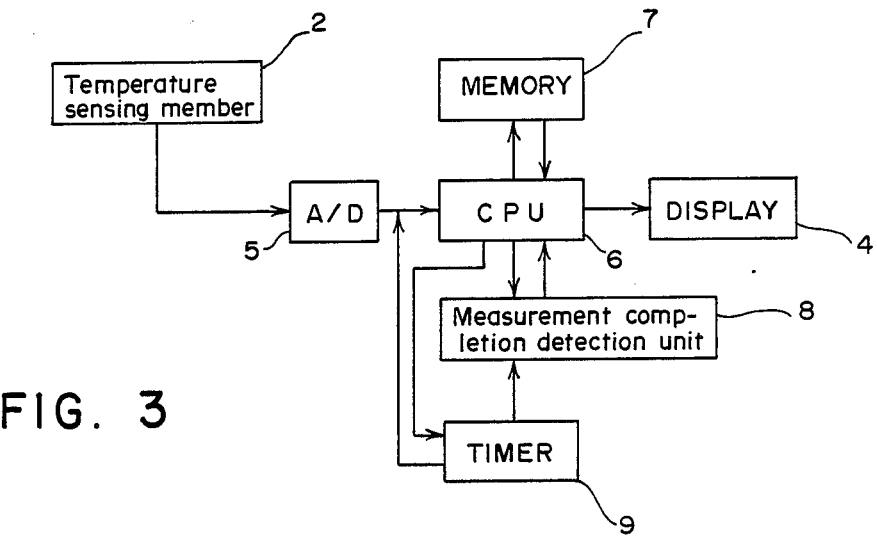
FIG. 3 is a block diagram of the control circuit of the thermometer of FIG. 1.

FIG. 3 is a block diagram of a control circuit of the thermometer of the present invention.

The temperature sensor 2 comprises a temperature sensing member such as a thermistor. The analog signal from the temperature sensor 2 is forwarded to an A/D converter 5 to provide corresponding digital signals. The digital signals are input to a Central Processing Unit (CPU) 6.

Responsive to the input electric signals, the CPU 6 calculates temperature values. The calculation program is stored within a read only memory (ROM). The temperature values are introduced from the CPU 6 to the display 4 and a memory 7.

The temperature values are forwarded to a measurement completion detection unit 8 to calculate differential values, namely, the increase in temperature values. When the differential values become less than a predetermined value, for example, 0.05 degrees Centigrade, a length of timer 9 is activated to count a time since the temperature measurement whose increase is less than the predetermined value. If the timer 9 detects the lapse of a predetermined time length while maintaining the measured temperature value, the current temperature value is assumed to be the final temperature value. The temperature measurement thus ends.

Figure 4:
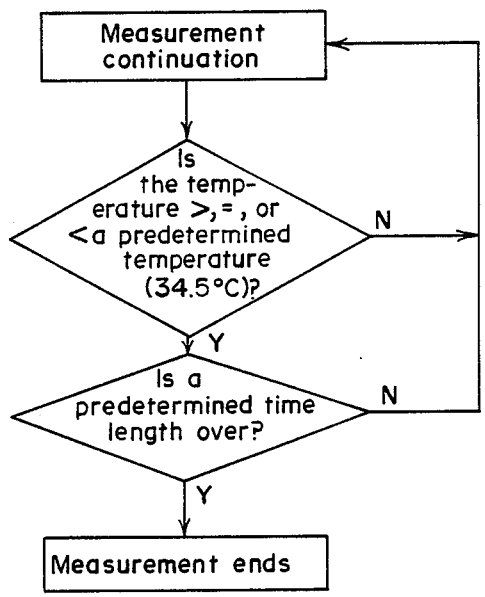
FIGS. 4 and 5 are a flow chart of the operation of the thermometer of FIG. 1.

FIG. 4 is a flow chart for measuring the temperature value as explained above.

Figure 5:
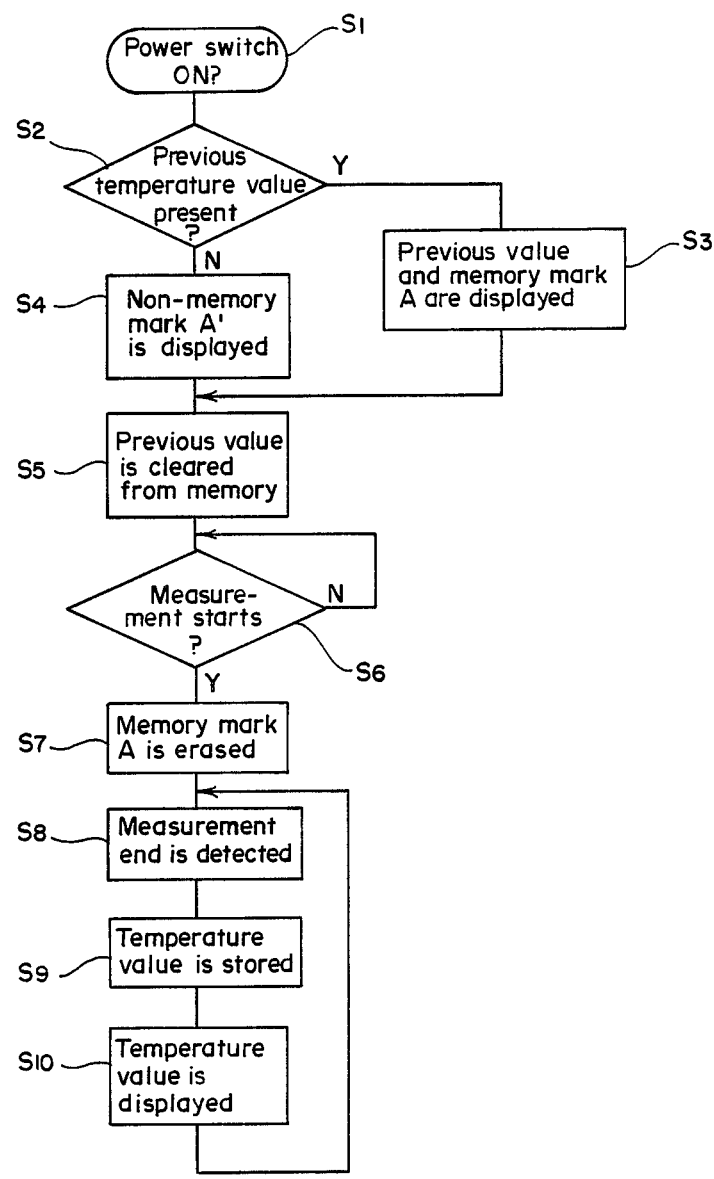

FIG. 5 is a flow chart for the operation of the thermometer of the present invention.

Step S1: The power switch 3 is turned ON.

Step S2: The CPU 6 accesses the contents of the memory 7 to detect the presence or absence of the previous temperature value.

Step S3: If the previous temperature value is present, the CPU 6 sends a signal to the display 4 so that the display 4 is permitted to display the previous temperature value and the memory mark A.

Step S4: If the previous temperature value is absent in the contents of the memory 7, the CPU 6 sends a signal to the display 4 so that the display 4 is permitted to display the non-memory mark A'. A display buffer is provided within the display 4 such that the temperature value forwarded from the CPU 6 is reserved until the next value is forwarded. The display is thus continued.

Step S5: The CPU 6 erases the previous temperature value in the memory 7.

Step S6: The temperature measurement is waited. Since the normal temperature value is 34.5 degrees Centigrade or more, the start of measurement is detected by determining that the temperature value in the CPU 6 is that value or more.

Step S7: Simultaneously with the start of a temperature measurement, the memory mark A and the non-memory mark A' are erased.

Steps S8-S9-S10: The temperature values are subsequently measured and displayed. The memory 7 is operated to replace the previous temperature value with the current temperature value for storage.

When, finally, the current temperature value is measured and displayed in the display 4, a buzzer may be operated to indicate the situation.

In step S2, the presence or absence of the previous temperature value is detected by referring to the roots of the contents of the memory 7. In step S6, once the CPU 6 can calculate the temperature value more than 34.5 degrees Centigrade, the temperature value starts to be entered to the memory 7. In step S5, when the temperature value obtained by the CPU 6 is less than 34.5 degrees Centigrade, the once-erased temperature value of the memory 7 in step S5 is still kept. The presence or absence of the previous temperature value is thereby detected by determining whether the memory 7 stores the presently measured value or still keeps the temperature value which has once been erased in step S5.

More particularly,

1. When the current temperature value is 34.5 or more:

The presence of the previous temperature value can be detected by determining that the contents of the memory 7 are erased in step S5 and replaced in step S6.

2. When the current temperature value is less than 34.5:

The presence of the previous temperature value can be detected by determining that the memory 7 does not store the presently measured temperature value, but still keeps the temperature value erased in step S5.

If the measurement of the temperature less than 34.5 is repetitively carried out, it may be possible that the contents of the memory 7 are completely cleared, so that the previous temperature value is eliminated.

The ability of the present thermometer to display the previous temperature value can be very important if it is necessary to track the increase or decrease in the body temperature of an individual.

According to the present invention, the memory 7 is powered to receive the displayed contents after the power switch 3 is turned OFF. Therefore, even if the power switch 3 is turned OFF erroneously before checking the measured temperature value, the ON state of the power switch 3 enables the display of the measured temperature value.

While only certain embodiments of the present invention have been described, it will be apparent to those skilled in the art that various changes and modifications may be made therein without departing from the spirit and scope of the present invention as claimed.

What is claimed is:

1. An electronic thermometer comprising:

sensing means for measuring a temperature value;

memory means for storing a previously measured temperature value;

display means for displaying a single temperature value; and control means for directing said previously measured temperature value from said memory means to said display means for display thereon, said control means further enabling said sensing means to measure a current temperature value, said control means supplying said current temperature value to said display for display thereon, said control means automatically enabling sequential display of said previously measured temperature value and said current measured temperature value by supplying to said display means said previously measured value; and then automatically supplying said current measured temperature value to said display means when said current measured temperature value is greater than or equal to a predetermined value;

said display means being provided with a selectively displayable memory indicia;

said control means directing said display to display said memory indicia when said previously measured temperature value is being displayed.

2. The electronic thermometer of claim 1, wherein said memory indicia is displayed only when said previously measured temperature value is displayed.

3. The electronic thermometer of claim 1, wherein said memory indicia is displayed at a separate location on the display from a location of said previously measured temperature value.

4. The electronic thermometer of claim 1, wherein said previously measured temperature is displayed as a digital number.

5. The electronic thermometer of claim 1, wherein:

said control means further causing said display means to display a second indicia indicating that said memory means has been cleared.

6. The electronic thermometer of claim 5 wherein said memory indicia forms a part of said second indica.

7. The electronic thermometer of claim 1, wherein said memory means is operated to retain said previously measured temperature value if said current measured temperature value is less than said predetermined value.

8. The electronic thermometer of claim 1, wherein said previously measured temperature value stored in said memory means is replaced by said current measured temperature value when said current measured temperature value is greater than or equal to said predetermined value.

* * * * *